(12) United States Patent
Pelletier et al.

(10) Patent No.: US 8,347,110 B2
(45) Date of Patent: Jan. 1, 2013

(54) PROTECTING A PROGRAM INTERPRETED BY A VIRTUAL MACHINE

(75) Inventors: Hervé Pelletier, Paris (FR); Osman Kocoglu, Paris (FR)

(73) Assignee: Morpho, Paris (FR)

( * ) Notice: Subject to any disclaimer, the term of this patent is extended or adjusted under 35 U.S.C. 154(b) by 600 days.

(21) Appl. No.: 12/307,889

(22) PCT Filed: Jul. 9, 2007

(86) PCT No.: PCT/FR2007/051620
§ 371 (c)(1),
(2), (4) Date: Jan. 7, 2009

(87) PCT Pub. No.: WO2008/007009
PCT Pub. Date: Jan. 17, 2008

(65) Prior Publication Data
US 2009/0300754 A1      Dec. 3, 2009

(30) Foreign Application Priority Data

Jul. 10, 2006  (FR) .................................... 06 06271

(51) Int. Cl.
*G06F 11/30* (2006.01)
*G06F 7/04* (2006.01)
(52) U.S. Cl. ........................... 713/189; 713/193; 726/26
(58) Field of Classification Search .......... 713/164–165, 713/167, 176–177, 179, 187–189, 193; 726/22, 726/26; 717/124–128, 131, 134–136, 138
See application file for complete search history.

(56) References Cited

U.S. PATENT DOCUMENTS

| | | | | |
|---|---|---|---|---|
| 6,327,661 | B1 * | 12/2001 | Kocher et al. ................. | 713/193 |
| 6,463,538 | B1 * | 10/2002 | Elteto .......................... | 713/190 |
| 6,591,415 | B1 * | 7/2003 | Torrubia-Saez .............. | 717/159 |
| 6,668,325 | B1 * | 12/2003 | Collberg et al. .............. | 713/194 |
| 2001/0012360 | A1 * | 8/2001 | Akkar et al. .................... | 380/29 |
| 2003/0048903 | A1 * | 3/2003 | Ito et al. ........................ | 380/263 |
| 2003/0110390 | A1 | 6/2003 | May | |
| 2003/0221116 | A1 * | 11/2003 | Futoransky et al. .......... | 713/189 |
| 2004/0172544 | A1 * | 9/2004 | Luo et al. ...................... | 713/189 |
| 2005/0021966 | A1 * | 1/2005 | Chow et al. ................... | 713/176 |
| 2005/0071653 | A1 * | 3/2005 | de Jong ........................ | 713/189 |
| 2005/0081073 | A1 * | 4/2005 | Williams ...................... | 713/320 |
| 2005/0084110 | A1 * | 4/2005 | Palmer .......................... | 380/268 |
| 2005/0198526 | A1 * | 9/2005 | Marr et al. .................... | 713/200 |

(Continued)

FOREIGN PATENT DOCUMENTS
EP      1 496 420      1/2005
(Continued)

OTHER PUBLICATIONS

International Search Report from counterpart application No. PCT/FR2007/051620; Report dated Nov. 16, 2007.

*Primary Examiner* — Darren B Schwartz
(74) *Attorney, Agent, or Firm* — Miller, Matthias & Hull LLP

(57) ABSTRACT

A method of protecting a program interpreted by a virtual machine comprises the inclusion of interference operations during the execution of each program instruction. The scrambling operations are selected according to a program digest, so as to vary when a single instruction belongs to two different programs. In this way, any attempt at reverse engineering from side channels is made possible.

7 Claims, 1 Drawing Sheet

U.S. PATENT DOCUMENTS

| | | | | |
|---|---|---|---|---|
| 2006/0053323 A1* | 3/2006 | Kissell | .......................... | 713/300 |
| 2007/0118832 A1* | 5/2007 | Huelsbergen | ................. | 717/151 |
| 2007/0300053 A1* | 12/2007 | Dale et al. | ......................... | 713/2 |
| 2008/0019507 A1* | 1/2008 | Fontana et al. | ................. | 380/28 |
| 2008/0148061 A1* | 6/2008 | Jin et al. | ....................... | 713/187 |

FOREIGN PATENT DOCUMENTS

| | | |
|---|---|---|
| WO | WO 99/01815 | 1/1999 |
| WO | WO 2005/111761 | 11/2005 |

\* cited by examiner

PROTECTING A PROGRAM INTERPRETED BY A VIRTUAL MACHINE

CROSS-REFERENCE TO RELATED APPLICATIONS

This application is a U.S. national stage filing of International Patent Application No. PCT/FR2007/051620 filed on Jul. 9, 2007, which claims priority under the Paris Convention to French Patent Application No. 06 06271, filed on Jul. 10, 2006.

FIELD OF THE DISCLOSURE

The present invention relates to protecting a program interpreted by a virtual machine. It relates in particular to a method of protecting the program and a device of virtual machine type which is adapted for implementing such a method.

BACKGROUND OF THE DISCLOSURE

In particular, the protection sought aims to prevent reverse engineering of the program. The object of reverse engineering is to identify the design of the program in order to copy, modify or hack it, often without the consent of the authors and/or holders of same.

A virtual machine is a computer device which is capable of executing a program stored in the form of a series of instructions and which, when the program is being executed, translates each instruction into a sequence of primary operations and carries out each of these operations. Such a machine makes it possible to separate the interface by means of which the program is stored or transmitted from the platform which carries out the primary operations.

The invention may be applied in particular to protecting a program which is written in Java Card language. Such a program is called an applet and its constituting instructions are op-codes, for "operation code", in the Java Card jargon.

In many fields which use computer programs to perform particular tasks, it is necessary to protect these programs in order to prevent them being modified beyond their original design or official purpose. Such programs may be used for the communication of data, in particular confidential data, for carrying out banking operations, in the field of computer games, etc. The series of instructions which constitute these programs must therefore be kept confidential, in order to prevent some of these instructions from being able to be modified to hack the program, or change a result produced when the program is being executed.

It is possible to retrieve the series of instructions which constitute a program by detecting variations of certain physical values which are caused by executing the program in an electronic device. These physical values may be, in particular, the power consumption of the device, or the electromagnetic field which is produced by the device. In the jargon of a person skilled in the art, these physical values which make it possible to identify the program instructions by executing the latter are called "side channels".

In order to retrieve program instructions which are initially unknown, it is thus possible arrange field sensors close to the device executing the program, and measure in real time while the program is being executed, the variations in the electromagnetic field caused by the operations carried out by the device. Variation sequences of the field are thus detected, which can then be compared to previously-indexed variation sequences. In this way, the successive instructions which constitute the program can be identified one by one. The program thus revealed in the form of the series of instructions can then be modified, in particular for fraudulent or malicious purposes. The program instructions can similarly be identified by detecting the variations in the power consumption of the device which are caused by the operations carried out while the program is being executed.

It is known to make the identification of the program instructions from the side channels more difficult by controlling the performance of additional instructions while the program is being executed. Such additional operations do not participate in obtaining a result of the program being executed, and have the sole function of interfering with the side channels. However, the addition of supplementary operations which depend only on the instruction which is in the process of being carried out does not cause any effective interference compared with an identification of the instructions carried out on the basis of indexed variation sequences of the side channels.

For this reason, it is also known to carry out an interference operation by controlling the realization of randomly-selected supplementary operations while the program is being executed. The significant variations of the side channels which correspond to the operations actually linked to the result of the program being executed are then distributed among the variations which correspond to the operations which are extraneous to the result, but which are carried out to interfere with the significant variations. However, the significant variations can still be isolated by executing the program a large number of times, and calculating an average and/or a correlation of the variations of the side channels which are detected during successive executions of the program. Indeed, due to their random nature, the additional instructions which are added for interference make a zero contribution to the averages and/or correlations carried out. The program instructions can thus still be identified, in spite of the interference.

An object of the present invention is therefore to effectively protect a program interpreted by a virtual machine by preventing the instructions of this program from being identified by reverse engineering.

SUMMARY OF THE DISCLOSURE

To this end, the invention proposes a method for protecting a program interpreted by a virtual machine, this program comprising a series of instructions and each instruction being translated into a sequence of operations carried out by the machine when the program is being executed, the method comprising the following stages:
  obtaining a program digest; and
  introducing, into the sequences of operations which correspond respectively to at least some of the program instructions, additional operations to be carried out while these instructions are being carried out, these additional operations not participating in a result of the program being executed and being selected as a function of the program digest.

Thus according to the invention the additional interference operations are not random but are determined from a program digest. It is recalled that a digest of a series of instructions or data is constructed by using a hashing function, and has the following properties:
  /1/ it is established in a manner which is deterministic and reproducible from the series of instructions or data;
  /2/ it is unlikely that two series of instructions or data which are different would result in identical digests; and /3/ it is impossible to retrieve the original instructions or data from the digest.

Due to property /1/ of the digest, the additional operations which are introduced during the execution of the program to interfere with the side channels are constant between two successive executions of the same program. As a result, these additional interference operations contribute to a statistical analysis of the variations of the side channels which are collected during repeated executions of the same program, in a manner identical to that of operations used for obtaining a result produced by the program. In other words, the additional interference operations cannot be distinguished from the useful operations during repeated executions of the same program.

Moreover, due to property /2/ of the digest, the additional operations which are introduced in sequences of operations which correspond to the same instruction used in two different programs are different. It is thus not possible to establish a correspondence between an instruction and a sequence of variations of side channels from several programs. In other words, the same instruction has a side-channel signature which varies according to the program in which this instruction is used.

The invention therefore achieves an effective protection against the identification of the program instructions from the side channels. It thus prevents any attempt of reverse engineering aiming to discover the program.

A first advantage of the invention results from the use of a program digest, which is currently well understood, both theoretically and practically.

A second advantage of the invention results from the fact that the protection obtained does not require modifying the program form or code as stored or transmitted to the virtual machine device which is intended to execute it. In particular, the task of a programmer of the device is not changed by a protection method according to the invention, because this protection is introduced downstream of the design and input of the program in the form of a series of instructions.

A third advantage of the invention results from the fact that the method of protection does not require supplementary devices for interfering with the side channels, such as noise generators.

The invention also relates to a device of the virtual machine type which comprises means of execution of a series of program instructions, these means of execution comprising:
  means of reading a program instruction;
  means of translating the instruction read into a sequence of operations to be carried out by the device when the program is being executed; and
  means of carrying out the operations of the sequence corresponding to the translated instruction.

A device of the virtual machine type according to the invention is characterized in that the means of translation of the instruction themselves include:
  means of obtaining a part of at least one program digest; and
  means of selecting additional operations which do not participate in a result of the program being executed, these means of selection being arranged for selecting the additional operations as a function of a part of the program digest, and for introducing them into the sequence of operations to be carried out by the device while the program is being executed.

Such a device, which achieves a protection of the programs executed by means of the latter, may be useful in many fields. In particular, the device may be incorporated into a mobile communications device, a contactless identification label, a contactless identification label reader, a chip card, a reader of such chip cards, an access control system, etc. By way of example, chip cards in which the invention may advantageously be implemented are in particular health service chip cards, identity or passport chip cards, banking chip cards, access control chip cards or electronic games media chip cards.

Optionally, the means of selecting the additional operations may be adapted to select them in a predefined set of operations. This selection may be carried out, in particular, according to successive segments of the digest, by re-starting the digest in a loop if necessary when the digest segment used goes beyond the end of the digest. Such an implementation of the invention is simple to program during the design of the virtual machine device.

According to two different embodiments of the invention, the virtual machine device may comprise means for producing the program digest, or means for receiving the digest from an external source.

BRIEF DESCRIPTION OF THE DRAWINGS

Other features and advantages of the present invention will appear in the following description of a non-limitative embodiment. This description is given with reference to the following figures.

DETAILED DESCRIPTION OF THE DISCLOSURE

Figures 1, 2:
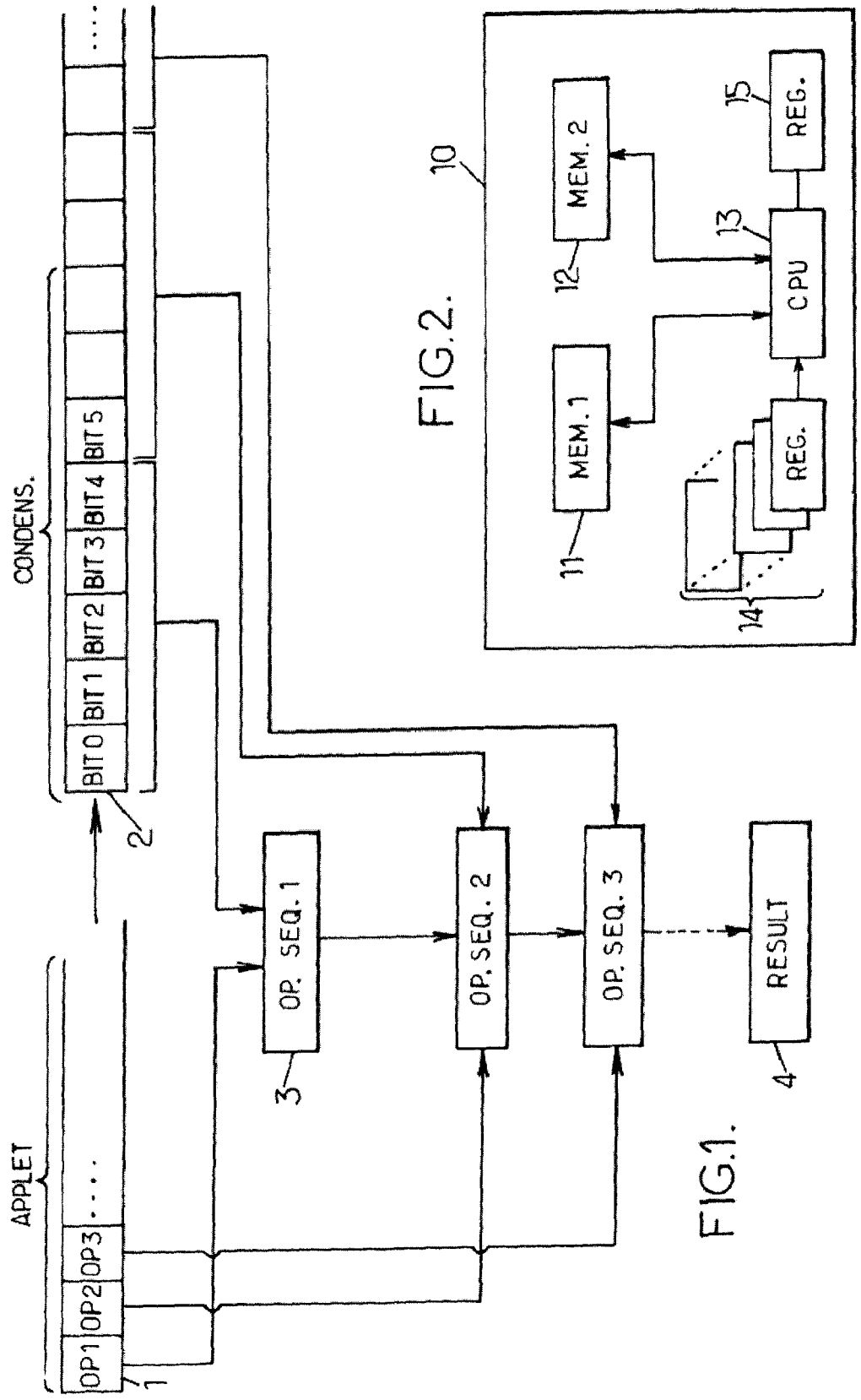
FIG. 1 is a diagram illustrating the principle of implementation of a program protection carried out according to the invention.
FIG. 2 illustrates a virtual machine architecture suitable for implementing the invention.

By way of example, the invention is described in detail for a device of the virtual machine type which is capable of executing a program presented in the form of a Java Card applet. The applet, which is numbered 1 on FIG. 1, is then constituted of a series of ordered instructions labelled OP1, OP2, OP3, etc. In a manner known per se, each program instruction is an op-code which, during an execution of the applet by the virtual machine, is translated into a series of primary operations which are carried out by one or more processors of the virtual machine.

The applet 1 may be stored in a first memory of the virtual machine, or be downloaded into the latter. It corresponds to a first input of the virtual machine.

According to the invention, a second input corresponds to a digest of the applet 1. Such a digest, numbered 2, is produced by a hashing function from the applet 1 itself. The principle and implementation of a hashing function are assumed to be known. By way of a non-limitative example, a hashing function which is derived from the function SHA-1 described in the standard "FIPS 180-2, Secure Hash Standard" published by the Federal Information Processing Standards body, may be used. Other hashing functions may be used in an equivalent manner. The digest 2 is constituted by a finite series of bits, which are determined in a unique manner from the applet 1. These bits are labelled BIT0, BIT1, BIT2, etc. The digest 2 may be calculated within the virtual machine. Alternatively, it may be calculated outside the virtual machine then provided to the latter. The digest 2 is stored in a second memory of the virtual machine.

In FIG. 2, the virtual machine is numbered 10. It comprises the first memory, labelled MEM.1, numbered 11 and intended to store the applet 1, the second memory, labelled MEM.2, numbered 12 and intended to store the digest 2, and a processor 13 labelled CPU. The processor 13 has access to the data stored in the memories 11 and 12. The machine 10 comprises moreover registers 14, labelled REG., which specify, for each applet op-code, the sequence of primary operations which are to be carried out by the processor 13 for executing this op-code.

During an execution of the applet 1 by the virtual machine 10, the processor 13 reads each op-code of the applet 1 (for example the op-code OP1 in FIG. 1) in the memory 11 and reports to the register 14 which corresponds to the latter. This register 14 indicates to the processor 13 the sequence of primary operations which must be carried out for this op-code. This sequence comprises on the one hand the operations which are necessary to obtain a result of the execution of the applet 1, and on the other hand the operations which are extraneous to this result. These latter operations only have a function of interfering with the side channels, by generating additional signals which are mixed with the signals of the operations which are effective in relation to obtaining the result. In other words, the extraneous or interference operations do not change the result of the execution of the applet 1, compared with an execution during which such operations would not be carried out.

When the processor 13 reads in a register 14 an operation command to be carried out which is useful in relation to the result of the execution of the applet 1, this operation may be carried out directly in the usual manner. When the processor 13 reads in the register 14 an operation command to be carried out for the purposes of interference, it reports to the digest 2 which is stored in the memory 12. The interference operation which must be carried out at the moment when the op-code is executed is then determined from the digest 2, according to a procedure which is originally provided for in the virtual machine 10 during its manufacture. For example, the processor 13 reads in the memory 12 a segment of the digest 2 which contains several successive bits of the latter. This segment of digest may be read following a segment previously read, during the determination of an interference operation previously carried out. The segment of the digest 2 which is read may be, for example, a segment of five successive bits. In particular, this may be the bits labelled BIT0 to BIT4, for a first segment which is read during the execution of the applet 1. The digest 2 may be returned to its start, to complete a read segment which is cut off by the end of the digest 2. The interference operation/s is/are selected as a function of the bits of the digest segment which is read. For example, the first three bits of the five-bit segment may be used to define one or more interference operations to be carried out, and the two last bits of the segment may define a ratio of an operational frequency change of the processor 13. The interference operations may be determined by the processor 13 by consulting a register 15, labelled REG., which is internal to the machine 10 and which indicates at least one interference operation to be carried out for each bit-triplet value. This interference operation may be a ROM (read only memory) reading, an EEPROM (electronically erasable programmable read only memory) reading, a RAM (random access memory) erasure, a cryptographic calculation, a data recopying, a writing to a memory, the activation of a charge pump, etc. It is then carried out by the processor 13. Thus, the interference operation is inserted among the op-code operations being processed which actually participate in obtaining the result of the execution of the applet 1. Moreover, the interference operations which are introduced in this way themselves depend on the applet which is in the process of being executed. For a single op-code, they thus vary depending on the applet which is executed. It is therefore not possible to establish a correspondence between a side channel sequence and an op-code.

Carrying out the sequence of operations which are indicated in the register 14 for the op-code 1, the register 14 being completed by the register 15 for determining the interference operations, is performed by the processor 13 in a manner identical to that described above. In the diagram in FIG. 1, this step is numbered 3 and labelled OP. SEQ. 1, to denote the sequence of operations corresponding to the op-code 1.

When the processor 13 has finished executing the sequence of operations of the instruction OP1, it processes the successive op-codes of the applet 1 in a similar way (stages labelled OP. SEQ. 2 and OP. SEQ. 3). When all the op-codes of the applet 1 have thus been processed and executed, a result of the execution of the applet is obtained (stage 4 labelled RESULT). This result is identical to that which would be obtained without introducing interference operations during the processing of each op-code of the applet.

It is understood that the implementation of the invention described in detail above is given as an illustrative example only. In particular, other methods may be used for selecting the interference operations according to the digest of the applet.

The invention claimed is:

1. A method for executing a program interpreted by a virtual machine, said virtual machine comprising:
    means for reading a program instruction;
    means for translating the instruction read into a sequence of operations to be carried out by the virtual machine when the program is being executed; and
    means for carrying out the operations of the sequence corresponding to the translated instructions,
    said program comprising a series of instructions and each instruction being translated into the sequence of operations carried out by the virtual machine when the program is being executed, the method comprising the following stages:
    obtaining a program digest based on the program;
    introducing, in the sequences of operations which correspond respectively to at least some of the program instructions, additional operations to be carried out while these instructions are being carried out, said additional operations not participating in a result of the program being executed and being selected as a function of the program digest, wherein the additional operations introduced in the sequences of operations are the same between successive executions of the program; and
    executing the program based on the sequences of operations including the additional operations, by using all of said means of the virtual machine, of carrying out the operations of the sequences corresponding to the translated instructions,
    wherein at least some of the additional operations are selected as a function of the program digest in a set of operations comprising a ROM (Read Only Memory) reading, an EEPROM (Electronically Erasable Programmable Read Only Memory) reading, a RAM (Random Access Memory) erasure, a cryptographic calculation, a data recopying, a writing to a memory, an activation of a charge pump and a variation of an operational frequency of a machine's processor.

2. The method according to claim 1, wherein the virtual machine is comprised in a mobile communications device, a contactless identification label, a contactless identification label reader, a chip card or a chip card reader.

3. The method according to claim 1, wherein additional operations successively introduced into the execution of the program are selected as a function of successive segments of the digest.

4. A device of virtual machine type comprising means of execution of a series of program instructions, said means of execution comprising:

means of reading a program instruction;

means of translating the instruction read into a sequence of operations to be carried out by the device when the program is being executed; and means of carrying out the operations of the sequence corresponding to the translated instruction, wherein the means of translation of the instruction themselves comprise:

means of obtaining at least a part of a program digest; and means of selecting additional operations not participating in a result of the program being executed, said means of selection being arranged for selecting the additional operations as a function of the program digest, and for introducing said additional operations into the sequence of operations to be carried out by the device when the program is being executed, so that said additional operations are executed within the sequences of operations by said means of carrying out the operations of the sequences corresponding to the translated instructions, and the additional operations introduced in the sequences of operations are the same between successive executions of the program, wherein the means of selecting are further arranged for selecting said additional operations as a function of the program digest in a set of operations comprising a ROM reading, an EEPROM reading, a RAM erasure, a cryptographic calculation, a data recopying, a writing to a memory, an activation of a charge pump and a variation of an operational frequency of a machine's processor.

5. The device according to claim 4, further comprising means for producing the program digest or receiving said digest from a source external to said device.

6. The device according to claim 4, the device is further comprised in a mobile communications device, a contactless identification label, a contactless identification label reader, a chip card or a chip card reader.

7. The device according to claim 4, wherein the means of selecting the additional operations are adapted for successively selecting the additional operations as a function of successive segments of the digest.

* * * * *